United States Patent

Janssen

[15] 3,638,057

[45] Jan. 25, 1972

[54] FIBER-OPTICAL PLATE COUPLING A LUMINESCENT SCREEN FOR THE DISPLAY OF AN IMAGE TO A PHOTOCONDUCTIVE LEAD MONOXIDE TARGET OF A TELEVISION CAMERA TUBE

[72] Inventor: Peter Johannes Michiel Janssen, Emmasingel, Eindhoven, Netherlands

[73] Assignee: U.S. Philips Corporation, New York, N.Y.

[22] Filed: Aug. 7, 1969

[21] Appl. No.: 848,178

[30] Foreign Application Priority Data

Aug. 14, 1968 Netherlands..........................6811521

[52] U.S. Cl...............................313/2, 313/65 LF, 313/92 R

[51] Int. Cl.....................................H01j 31/49, H01j 31/00

[58] Field of Search................................313/65, 2, 3, 65 LF

[56] References Cited

UNITED STATES PATENTS

| | | | |
|---|---|---|---|
| 2,825,260 | 3/1958 | O'Brien | 313/89 X |
| 3,058,021 | 10/1962 | Dunn | 313/65 |
| 3,361,919 | 1/1968 | Kiuchi et al. | 313/65 A |
| 3,376,446 | 4/1968 | De Haan et al. | 313/65 A |
| 3,424,932 | 1/1969 | Sheldon | 313/3 X |

*Primary Examiner*—Robert Segal
*Attorney*—Frank R. Trifari

[57] ABSTRACT

An image transmission system for coupling a luminescent screen for displaying an image to a photoconductive lead monoxide target of a television camera tube comprises an fiber-optical plate employing light-conducting fibers between the luminescent screen and the television camera tube. The luminescent screen luminesces principally in a spectral region below about 4,000 A. and the fibers are coated with a material having a relatively high absorption at least in that region, and preferably the coating is opaque.

1 Claims, 3 Drawing Figures

Figure 1:
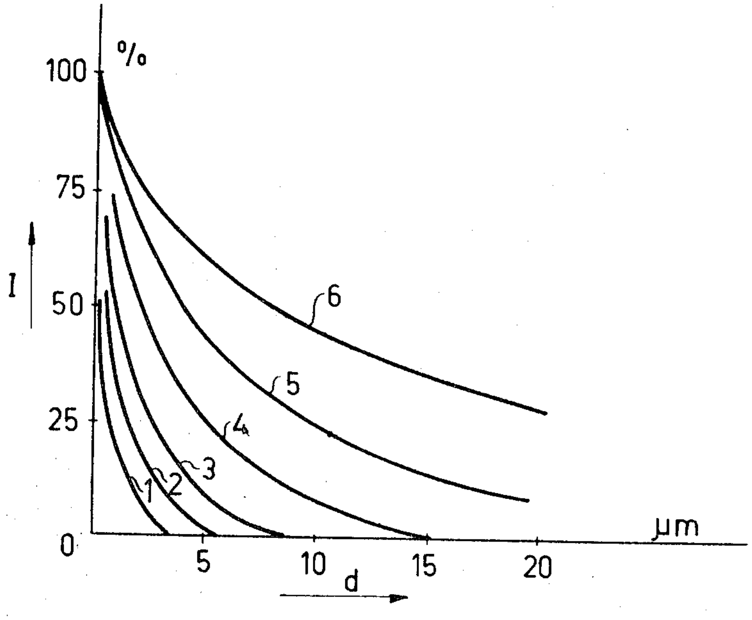

INVENTOR.
PETER J.M. JANSSEN

BY

AGENT

INVENTOR.
PETER J.M. JANSSEN
BY
Frank R. Trifari
AGENT

FIBER-OPTICAL PLATE COUPLING A LUMINESCENT SCREEN FOR THE DISPLAY OF AN IMAGE TO A PHOTOCONDUCTIVE LEAD MONOXIDE TARGET OF A TELEVISION CAMERA TUBE

The invention relates to an image transmission system comprising a fiber-optical plate coupling a luminescent screen for collecting corpuscular or electromagnetic radiation with a photoconductive target plate of a television camera tube of the Vidicon type, consisting mainly of lead monoxide.

Such an image transmission system employed in an electron microscope is known from British Pat. No. 1,135,153. It has been found that the definition of the picture on a monitor fed by amplified television signals from the camera tube is definitely inferior to that of the picture on the phosphor screen which can be directly observed visually, with which screen the camera tube is coupled through said fiber-optical plate.

The invention is based on the discovery that a fiber-optical plate gives rise to straying of the luminescent light transmitted by said plate in the photoconductive, lead monoxide layer of the camera tube, resulting in loss of detail definition of the television picture on the monitor. The invention has for its object to provide measures for practically obviating this stray.

According to the invention in a device of this kind the emission of the phosphor screen is mainly located in the spectral region having a wavelength of less than about 4,000 A. and the fibers of the fiber-optical plate are coated with a material having a comparatively high absorption at least in said spectral region. The fibers of the fiber-optical plate are preferably coated with a layer of opaque material.

The effect obtained by the measures in accordance with the invention may be accounted for by the fact that on the one hand a layer of mainly tetragonal lead monoxide has an absorption coefficient strongly increasing with decreasing wavelengths for electromagnetic radiation in the visible region and the adjacent ultraviolet region, so that the penetration depths for light of different wavelengths are quite different and on the other hand the light emanating from each fiber of the fiber-optical beam has a large angular aperture. The region of the target plate in which the conical light beam from any fiber is absorbed in the lead monoxide, where it releases charge carriers which determine the potential range of the target plate in the camera tube to be scanned by the electron beam, exhibits with a greater penetration depth of the light concerned considerably greater dimensions in the plane of the layer than the corresponding region with light having a considerably smaller penetration depth.

When the luminescent picture of a single window is used not only for direct visual observation but also for observation via a camera tube of the kind set forth coupled by means of a fiber-optical plate, it is advantageous for an improved direct observation to include in addition light of longer wavelengths in the luminescent light and to provide in this case the window of the camera tube with means allowing only the desired light of shorter wavelengths to pass to the target plate. For this purpose an optical filter may be employed.

The invention will be described more fully hereinafter with reference to the drawing in which FIG. 1 shows the curves indicating the relative values of the penetration depths of different wavelengths in mainly tetragonal lead monoxide.

Figure 2:
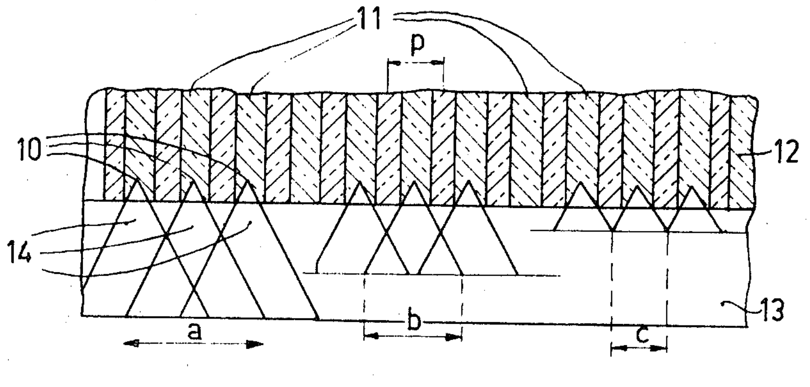
Figure 3:
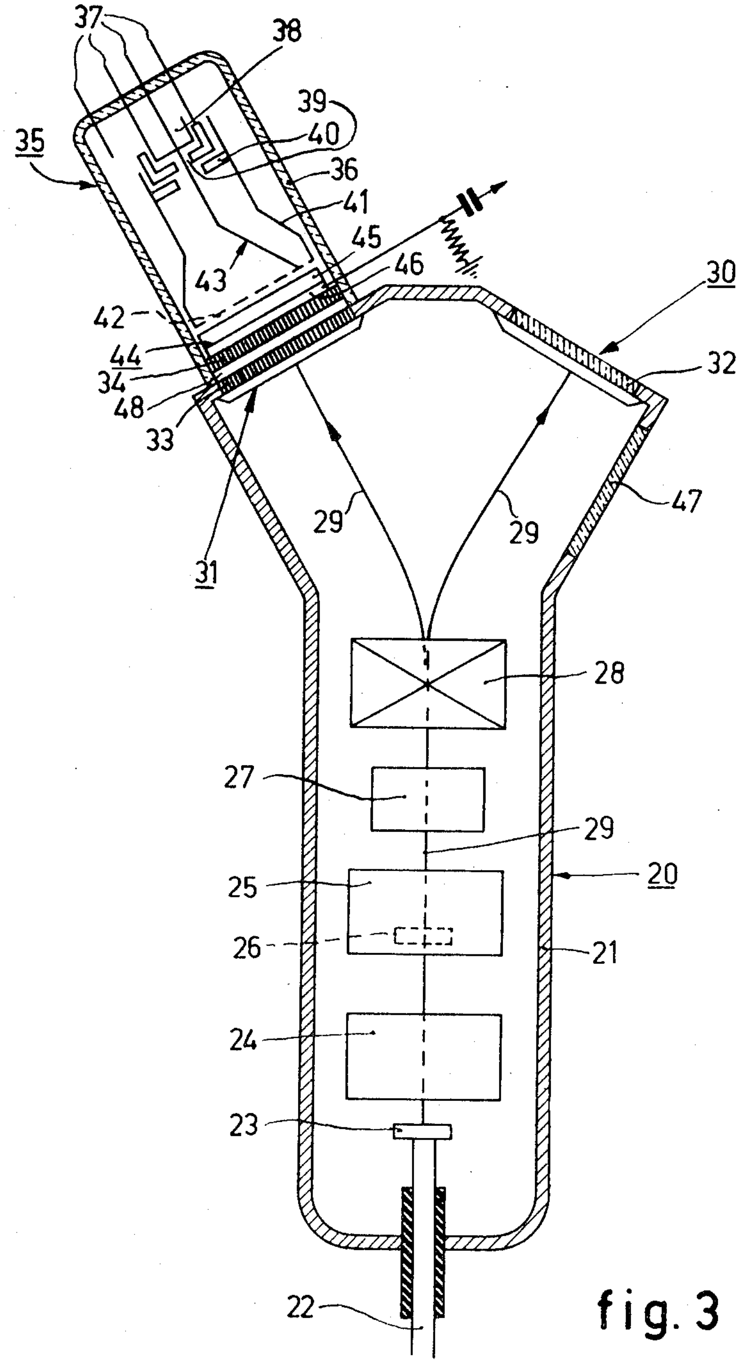

FIG. 2 illustrates the stray of the light emanating from the fibers of the fiber-optical plate and penetrating into a layer of lead monoxide being in contact therewith and FIG. 3 shows a preferred embodiment of the invention comprising an image-producing device suitable for use in the transmission system.

When, as is shown in FIG. 1, the depth in the layer of lead monoxide up to the total thickness of about 20 mμ is plotted from the origin of an orthogonal coordinate system on the abscissa and the light intensity variation is plotted on the ordinate and when the wavelength of the light is used as a parameter, the various curves 1 to 6 indicate the penetration depths of the light concerned in the layer. From this graph it is apparent that according to curve 1 the blue light of a wavelength of 3,800 A. is completely absorbed already within a few micrometers. With curve 2, still blue light, this is true only after 5 mμ, whereas according to curve 3 the blue-green light of a wavelength of 4,600 A. penetrates to about 10 mμ. The green light of a wavelength of 5,000 A. penetrates, as is shown by curve 4, partly through the whole layer whereas of the light of still greater wavelength only part is absorbed in the layer as is illustrated by curves 5 and 6. The portion of this light, which penetrates up to the rear side of the lead monoxide layer will be reflected there and give rise to further stray.

FIG. 2 shows that light beams 10 emanating from the individual fibers 11 of a fiber-optical plate 12 and penetrating into a layer of lead monoxide 13 have a large angular aperture 14. The lateral dimensions of the region of the lead monoxide layer in which such a light beam is absorbed while releasing charge carriers will therefore intimately depend upon the penetration depth in the layer. As is shown in FIG. 1 a considerable portion of light of a wavelength of more than about 5,400 A. penetrates up to the rear side of the layer and the regions affected by each fiber will at least have a diameter *a* (FIG. 2) so that the regions associated with adjacent fibers strongly overlap each other. The diameter *b* of the corresponding regions associated with light of a wavelength of about 4,200 A. is much smaller but even this diameter is still considerably larger than the central distance *p* of the fibers of the fiber-optical plate. Only when light of a wavelength of less than about 4,000 A. is used, said regions then having a diameter *c* will, at most, scarcely overlap each other and will be approximately equal to the central distance of the fibers. The fact that the absorption regions of light from adjacent fibers are just in contact with each other may provide an approximation of an optimum combination of the properties of the fiber-optical plate, the wavelength of the light used and of the absorption properties of the lead monoxide layer, since it is useless to make the regions finer than the structure already determined by the fibers.

FIG. 3 shows schematically one embodiment of a device in accordance with the invention employed in an electron-optical arrangement, particularly an electron microscope comprising two phosphor screens. Such an electron-microscope 20 has a vacuumtight wall 21 through which below a supply cable 22 is taken, which is connected to a cathode 23. The Figure shows from bottom to top inside the wall a condenser 24, an objective lens 25 in which the object 26 is arranged, a projection lens 27 and an electron-optical system 28 by which the beam of image-producing electrons 29 can be optionally directed to the screen 30 or 31. The screen 30 is provided with a green light emitting material conventionally used in electron microscopes, for example, silver-activated zinc sulphide, whereas the second screen 31 is provided in accordance with the invention with a phosphor material emitting shortwave light, for example cesium activated calcium magnesium silicate or silver-activated zinc cadmium sulphate. The wall portion 32 forming the screen 30 with the green light emitting material applied to its inner side is made in a conventional manner of optically flat glass through which the picture can be observed from the outside. The wall portion 33 forming the screen 31 with the material emitting shortwave light applied to its inner side consists of a fiber-optical plate optically joined intimately by a second fiber-optical plate 34 forming the window of a camera tube 35. The fibers of the two fiber-optical beams may be provided with a black envelope. The camera tube comprises a cylindrical envelope 36 joining the window 34 having through-connections 37, a cathode 38, a control-grid 39, a second grid 40, a collector 41 and a gauze 42. In this camera tube a beam of slow electrons 43 scans a photoconductive target plate 44 on the inner side of the window 34. The target plate comprises a photoconductive layer 45 of about 20 mμ thickness mainly of lead monoxide and on the side of the window 34 a transparent signal electrode 46, for example, of conductive tin oxide. The signal of this electrode feeds a monitor (not shown) on which the picture of the screen 31 can be observed.

If the electron-optical device comprises only one phosphor screen, a window 47 may be provided for visual observation in the wall which then has, of course, a different shape, so that the screen can be observed on the inner side. The screen may then be provided with the phosphors of the screens 30 and 31 in common. In this case the phosphor screen may comprise a substance having two luminescence peaks, one of which is located in the shortwave spectral region and the other is located in the green spectral region, for example hexagonal zinc oxide. In this case an optical filter 48 has to be provided between the phosphor screen and the target plate of the camera tube, so that only the shortwave portion of the luminescent light can attain the target plate. This filter 48 may be formed by a very thin layer of vapour-deposited silver. Instead thereof or in addition thereto the cores of the fibers of one of the plates or of both may be made of a colored kind of glass transparent only to the shortwave light. If the direct visual observation takes place on the side of the camera tube, and when therefore this tube is detachable, the optical filter element has to be arranged in or on the part detachable with the camera tube.

What is claimed is:

1. An image transmission system comprising a luminescent screen including a first phosphor which luminesces in the green spectral region and a second phosphor which luminesces in the blue-ultraviolet spectral region, a television camera tube including a target plate consisting essentially of lead monoxide, an optical coupling member between the luminescent screen and the target plate of the camera tube, said optical coupling member comprising a plate including a plurality of light-conducting fibers, each of said fibers having a coating thereon of a material which absorbs light in the blue-ultraviolet spectral region, and filter means between the luminescent screen and the target plate of the camera tube which transmits only shortwave length luminescent light said system further including a window for observation of light emitted by said first phosphor.

* * * * *